United States Patent [19]

Bartholomew

[11] Patent Number: 4,885,478

[45] Date of Patent: Dec. 5, 1989

[54] TECHNIQUE TO IMPROVE THE EFFICIENCY OF NONLINEAR OPTICAL PROCESSES

[75] Inventor: Bruce J. Bartholomew, Poway, Calif.

[73] Assignee: General Dynamics Corporation, Convair Division, San Diego, Calif.

[21] Appl. No.: 225,112

[22] Filed: Jul. 25, 1988

[51] Int. Cl.$^4$ ............................................. H03F 7/00
[52] U.S. Cl. .................................................. 307/425
[58] Field of Search .......................... 307/425; 372/21

[56] References Cited

U.S. PATENT DOCUMENTS 3,983,406 9/1976 Lax et al. ............................. 307/425

Primary Examiner—James W. Davie
Attorney, Agent, or Firm—John R. Duncan

[57] ABSTRACT

The invention provides structure and method for improving the efficiency of nonlinear optical processes where two light beams interact in a material to produce an output beam at a new frequency. Effective phase matching is accomplished by periodically removing the output beam energy so that it does not destructively interfere with the input. The invention can also be utilized to increase the efficiency of optical devices where partial phase matching is present without further adjusting the phase of the beams involved in the nonlinear interaction. The invention also provides effective beam phase matching where the beams passing through the nonlinear material cannot normally be phased matching by present methods.

5 Claims, 1 Drawing Sheet

TECHNIQUE TO IMPROVE THE EFFICIENCY OF NONLINEAR OPTICAL PROCESSES

BACKGROUND OF THE INVENTION

The invention is directed to apparatus and method for improving the efficiency of nonlinear optical process where the phase matching of the light beams passing through the nonlinear material, cannot be achieved by conventional means. This invention effectivly phase matches partially phased or non-phased matched beams by periodically removing the output energy of the beams after mixing within the nonlinear material.

A large body of literature exists on nonlinear processes and phase matching techniques employed to phase match light beams passing through nonlinear material. None of these techniques teach phase matching by removal of the output beam.

A key requirement for efficient nonlinear operation in devices of this type is that the beams be phased matched. Phase matching involves setting up the operating conditions so that the propagation vector of the output beam is equal to the sum of the propagation vectors of the input beams, ie. the, output beam is equal to the sum of the propagation vectors of the input beams, ie.

$$k_o = \sum_{j=1}^{N} k_j$$

where $$k_o = \frac{2\pi n_o}{\lambda_o} s_o$$

$$k_j = \frac{2\pi n_j}{\lambda_j} s_j$$

$\lambda_o, \lambda_j$ = vacuum wavelengths of output and input beams respectfully $n_o, n_j$ = indices of refraction for output and input beams respectfully N = number of input beams $s_o, s_j$ = unit vectors in the propagation direction Typically, phase matching is achieved by selecting the material, operating wavelengths and propagating directions correctly. The problem is well understood and detailed descriptions of phase matching techniques can be found in the technical literature e.g., in Applied Nonlinear Optics by Fritz Zernike and John E. Midwinter, chapter 3.

An important concept to understand about phase matching is that the waves interact constructively over a length $l_c$ called the coherence length. After propagating a length $l_c$ the waves interfere destructively for a length $l_c$ and the process repeats. The distance $l_c$ is equal to:

$$l_c = \frac{\pi}{\Delta k}$$

where $$k = \left| k_o - \sum_{j=1}^{N} k_j \right|$$

For a crystal of length $L \gg l_c$ the total nonlinear output appears to come from a region only $l_c$ long and the material is used very inefficiently.

Another important characteristic of the state of the art nonlinear processes is that many of the materials with the largest nonlinear coefficient cannot be phased matched because there is no combination of $n_o$, $n_j$, $\lambda_o$, $\lambda_j$, $s_o$, and $s_j$ that leads to $\Delta k = 0$.

U.S. Pat. No. 3,983,406, by inventors Lax et al., describes a technique to improve the efficiency of a nonlinear process by using multiple internal reflections. The converted signal and the reference signals all travel through the nonlinear medium where some adverse reverse mixing occurs and the reference signals and the converted signal are not separated until they leave the nonlinear medium.

The present invention improves the present state of the art by more efficiently separating the input beams and the resulting output beam from each other, thus preventing destructive interference mixing thereof without concern to the phase relationship of the input and output beams.

SUMMARY OF THE INVENTION

The present invention is directed to a new approach to nonlinear process involving two or more light beams which interact in a medium to form a new beam with a minimum of destructive interface of the new beam with the input beams without concern to related phase relationships of the two or more light beams.

The invention reduces or eliminates the destructive interference by providing a means of removing the output beam from the nonlinear material after the beams have propagated through the distance $d = m\, l_c$ (where m = integer > 0). The input beams continue in the material for another interval d where the output is again removed. The process continues as long as practicable. By removing the output beam in this manner the destructive interference phenomenon is prevented and a large fraction of the propagation length in the material can be used efficiently.

An object of this invention is to provide efficient nonlinear processes, e.g. mixing of incoming light beams into a third different frequency light beam, by passing the beams through a nonlinear material with a minimum of destructive interference phenomenon without concern to phase matching.

An other object of this invention is to provide the mixing of at least two separate input frequency light beams within a nonlinear material to produce a third frequency light beam produced therefrom and provide means for removing the third frequency output light beam produced by the nonlinear material after the beams have propagated through a distance $d = m\, l_c$ (where m = integer > 0), allowing the input beams to continue in the nonlinear material for another interval d where the third or mixed frequency output is again removed and continuing the process as long as practicable.

Still another object of the invention is to provide passband dielectric reflector coatings to the light receiving and light exiting surfaces of a nonlinear material whereby the input frequency light beams entering the nonlinear material are reflectively contained, reflect back and forth between the input and output surfaces and propagate within the nonlinear material and the third frequency light beam produced by the mixing of the input light beam signals pass through a dielectric reflector coatings with minimum resistance thereto each time the input frequency signals strike the coatings.

Still another object of the invention is to remove a third frequency light beam at yet a different frequency produced by the mixing together of at least two different input frequencies light beams within a nonlinear material at predetermined distance intervals sums together these removed light beams to produce the single third frequency light beam at a combined elevated intensity level which exits said nonlinear material.

The features of the present invention which are believed to be novel are set forth with particularly in the appended claims. The organization and manner of operation of the invention, together with further objects and advantages thereof may be best understood by reference to the following description taken in connection with the accompanying drawings, in the several figures of which like reference numerals identify like elements and in which:

DETAILED DESCRIPTION OF THE FIRST EMBODIMENT

Figure 1:
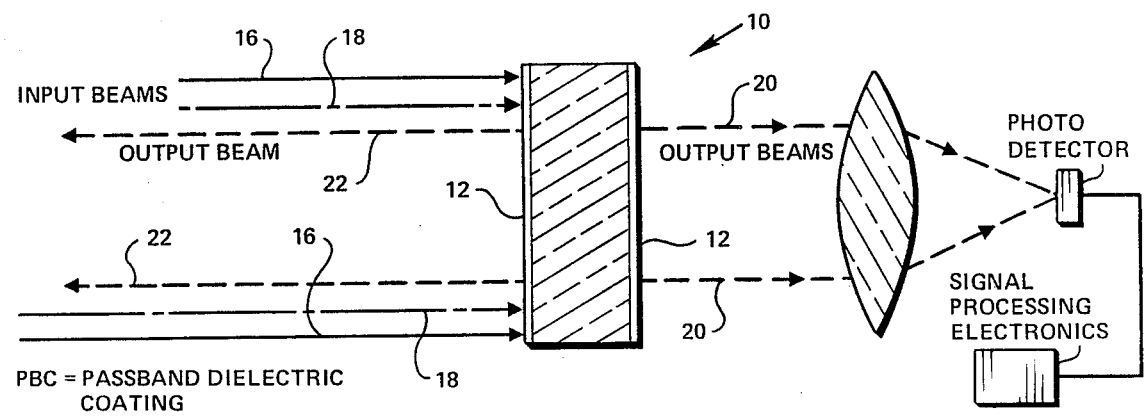
FIG. 1 is a schematic showing of a first embodiment of the invention employing resonant cavity techniques.

Referring now specifically to FIG. 1, this first embodiment teaches a resonant cavity technique of practicing the invention. A resonate cavity 10 is constructed by high reflectance mirrors 12 formed from dielectric coatings positioned on each side of nonlinear material 14 forming and etalon. This nonlinear material may be GaAs, CdTe crystals or the like suitable for the purpose intended. The reflectance mirrors 12 are made from multiple dielectric layers and are not designed as ordinary mirrors. Instead they are multi-layer interference filters with a peak transmittance at a selected output wavelength.

For example, if the frequencies of the two out of phase frequencies to be combined were 10.6μ and 1.06μ the selected transmission wave length would be 0.96μ or if the frequencies were 10.6μ and 0.598μ the selected transmission wave length would be 0.566μ, ie. the coatings have a low reflection at the selected transmission wave length to let the up-converted light escape the etalon. Any selected frequencies can be handled in this manner so long as the low reflection characteristics of the etalon is selected to the frequency of the combined incoming frequencies. Although generally the power of one of the incoming frequencies is much greater than the other, for example, in a laser system the pump frequency (one of the incoming frequencies) will be in the range of $-10^3-10^6$ watts/cm$^2$ and the other frequency in the range of $-10^{-8}-10^{-10}$ watts. In this example the etalon resonates at the pump frequency to amplify the intensity of the pump frequency in the material and it is approximately resonant to the other incoming signal. The thickness t of the etalon produced in this manner is made approximately equal to $ml_c$ (for m as small as practical) and the etalon is tuned to resonance with the two input beams 16 and 18. The resonance condition can be achieved by choosing t and the temperature correctly for given values of $n_j$ and $\lambda_j$. At resonance the intensity of the beams 16 and 18 inside the cavities increases, causing the efficiency to rise. Because the mirrors 12 pass only the output wave length which is a summation of beams 16 and 18 the output energy leaves the cavity and destructive interference between the photons propagating back and forth between the mirrors and the output photons does not occur. Various means of collecting the output beam 20 are available and even the backward propagating output beam 22 can be used efficiently. An example of a collecting means is a simple focus lens 22 that focuses the beam 20 on a detector 24 such as, for example, a photomultiplier tube, for visible light, a silicon photo diode, for infrared light, or similar devices which passes the beam energy to signal processing electronics 26.

Figure 2:
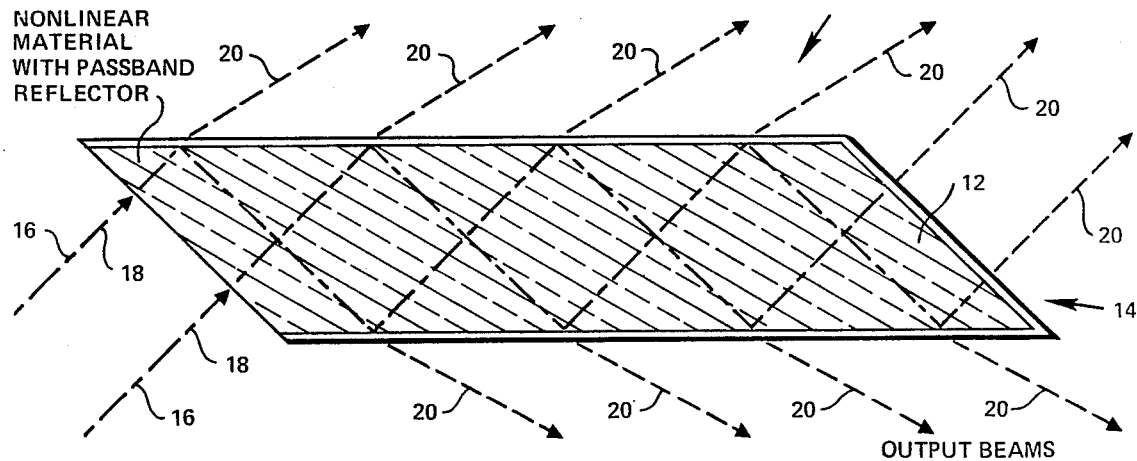
FIG. 2 is a schematic showing of a second embodiment of the invention employing multiple reflection technique.

FIG. 2 depicts a second embodiment of the invention which teaches a multiple reflection technique. In this embodiment, an etalon formed from a piece of nonlinear material 14 is fabricated with plane parallel faces 24 and each face 24 is covered with passband interference reflector 12 similar to or the same as the one used on the resonant cavity 10 above. The propagation length between the faces of the crystal is made equal to $ml_c$ again m is as small as possible. As the beams 16 and 18 bounce back and forth between the parallel faces the output beam escapes each time they travel $ml_c$, again preventing destructive interference. All of the output beams are collected and added together, increasing the efficiency by the number of bounces. By tilting the input beams 16 and 18 slightly the multiple bounces will carry the beams in a third dimension (perpendicular to the plane of the Figure) and the number of bounces can be increased.

Figure 3:
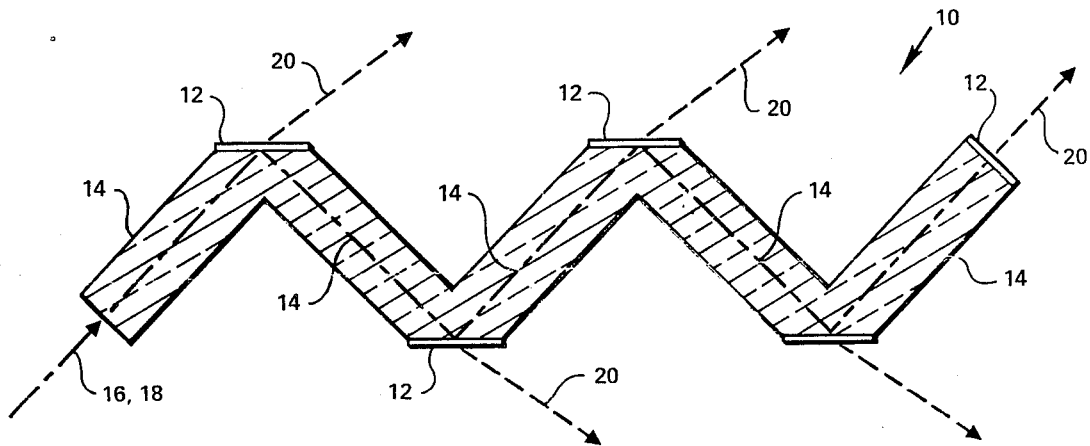
FIG. 3 is a schematic showing of a third embodiment of the invention employing waveguide techniques.

FIG. 3 depicts a third embodiment of the invention. In this embodiment the device is very similar to the plane parallel multiple reflection resonant etalon device of FIG. 1 except that the input beams 16 and 18 propagate in a waveguide of nonlinear material 14. The advantage of the waveguide approach is that a long path with no beam divergence can be made. The zig-zag path is constructed so that the output escapes from the guide every time the beams propagate a distance equal to $ml_c$. The output beams are collected by the means mentioned above and added together increasing the efficiency by the number of separate outputs.

Further modifications of the invention herein disclosed will occur to persons skilled in the art and all such modifications are deemed to be within the spirit and scope of the invention defined herein as defined by the claims:

What is claimed is:

1. Nonlinear optical system for improving the output efficiency of the combining of at least two out of phase light beams of different frequencies into a light beam of a third frequency without the aid of phase matching comprising:

nonlinear material for receiving and mixing said at least two out of phase light beams into a single combined light beam of a frequency different than either of said out of phase light beams, said nonlinear material having a first surface for receiving said light beams of different frequencies and at least one second output surface for passing said single combined light beam of a different frequency from said nonlinear material;

a passband coating formed from multiple layers of dielectric material positioned on said first and at least one second output surface, said combined thickness of said nonlinear material and said dielectric coating having a thickness of approximately the coherence length of the frequency of said single combined light beam, said dielectric having a peak transmittance at the frequency of said single combined light beam; and means for collecting said single combined light beam leaving said at least one output surface.

2. The invention as defined in claim 1 wherein said at least one output surface comprises multiple output surfaces and said collecting means collects and adds together each single combined light beam from said multiple output surfaces.

3. The invention as defined in claim 2 wherein the number of said multiple output surfaces exceed three.

4. The invention as defined in claim 2 wherein said nonlinear material is zig-zag in longitudinal cross-section whereby said combined output escapes from said nonlinear material each time the combined light beam propagates the distance equal to the coherence length of the single combined light beam.

5. The invention as defined in claim 1 wherein said at least two out of phase light beams bounce back and forth between said passband coatings and each time said single combined light beam impacts said passband coatings said single combined light beam exits said nonlinear material and is collected by means for collecting said single combined light beam exiting said passband coating.

* * * * *